US011045759B2

United States Patent
Ingram et al.

(10) Patent No.: US 11,045,759 B2
(45) Date of Patent: Jun. 29, 2021

(54) PREMIX FOR PRODUCING AN ABSORPTION AGENT FOR REMOVING ACID GASES FROM A FLUID FLOW

(71) Applicant: BASF SE, Ludwigshafen am Rhein (DE)

(72) Inventors: Thomas Ingram, Ludwigshafen (DE); Gerald Vorberg, Ludwigshafen (DE); Georg Sieder, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 53 days.

(21) Appl. No.: 16/093,731

(22) PCT Filed: Apr. 6, 2017

(86) PCT No.: PCT/EP2017/058285
§ 371 (c)(1),
(2) Date: Oct. 15, 2018

(87) PCT Pub. No.: WO2017/182289
PCT Pub. Date: Oct. 26, 2017

(65) Prior Publication Data
US 2019/0126193 A1    May 2, 2019

(30) Foreign Application Priority Data
Apr. 18, 2016   (EP) .................................. 16165810

(51) Int. Cl.
*B01D 53/14* (2006.01)
*C10L 3/10* (2006.01)

(52) U.S. Cl.
CPC ..... *B01D 53/1493* (2013.01); *B01D 53/1462* (2013.01); *B01D 53/1468* (2013.01); *B01D 53/1475* (2013.01); *C10L 3/102* (2013.01); *C10L 3/103* (2013.01); *C10L 3/104* (2013.01); *B01D 2252/20426* (2013.01); *B01D 2252/20431* (2013.01); *B01D 2252/20478* (2013.01); *B01D 2252/20489* (2013.01); *B01D 2252/504* (2013.01); *B01D 2252/604* (2013.01); *B01D 2257/302* (2013.01); *B01D 2257/306* (2013.01); *B01D 2257/308* (2013.01); *B01D 2257/408* (2013.01); *B01D 2258/0283* (2013.01); *C10L 2290/541* (2013.01); *C10L 2290/545* (2013.01); *Y02C 20/40* (2020.08)

(58) Field of Classification Search
None
See application file for complete search history.

(56) References Cited

U.S. PATENT DOCUMENTS

| | | | | |
|---|---|---|---|---|
| 3,320,162 A * | 5/1967 | Axe | ...................... | C10M 159/24 508/397 |
| 3,320,164 A * | 5/1967 | Brunel | ...................... | C10M 1/08 508/362 |
| 4,347,227 A * | 8/1982 | Hass | ...................... | B01D 53/60 423/235 |
| 4,466,902 A * | 8/1984 | Kumagae | ............... | C23F 11/145 252/391 |
| 4,892,674 A * | 1/1990 | Ho | ...................... | B01D 53/1493 252/189 |
| 5,531,987 A * | 7/1996 | Bauer | ...................... | A61K 8/46 424/76.21 |
| 5,843,299 A * | 12/1998 | Minevski | ............ | B01D 53/1493 208/47 |
| 5,985,179 A * | 11/1999 | Minevski | ............ | B01D 53/1493 252/395 |
| 6,734,155 B1 * | 5/2004 | Herbots | ................ | C11D 3/2079 510/300 |
| 10,214,482 B2 * | 2/2019 | Ingram | ................ | C07C 217/42 |
| 10,464,013 B2 * | 11/2019 | Vorberg | ............. | B01D 53/1468 |
| 10,525,404 B2 * | 1/2020 | Ingram | ............. | B01D 53/1493 |
| 10,617,993 B2 * | 4/2020 | Vorberg | ............. | B01D 53/1468 |
| 2010/0204042 A1 * | 8/2010 | Asprion | ............ | B01D 53/1493 502/401 |
| 2010/0288125 A1 * | 11/2010 | Vorberg | ............. | B01D 53/1462 95/181 |
| 2013/0152782 A1 * | 6/2013 | Yokoyama | ......... | B01D 53/1412 95/8 |

(Continued)

FOREIGN PATENT DOCUMENTS

| EP | 0 134 948 A2 | 3/1985 |
|---|---|---|
| EP | 2 990 090 A1 | 3/2016 |
| WO | WO 2007/135100 A1 | 11/2007 |

OTHER PUBLICATIONS

Christine F. Braban, et al., "Phase Transitions of Malonic and Oxalic Acid Aerosols", J. Phys. Chem. A, vol. 107, 2003, pp. 6594-6602.
Mauro L.N. Oliveira, et al., "Solubility of 1,4-butanedioic acid in aqueous solutions of ethanol or 1-propanol", Fluid Phase Equilibria, vol. 326, 2012, pp. 50-53.

(Continued)

*Primary Examiner* — Joseph D Anthony
(74) *Attorney, Agent, or Firm* — Grüneberg and Myers PLLC

(57) ABSTRACT

A premixture for producing an absorbent for removing acid gases from a fluid stream containing a) at least a tertiary amine and/or a sterically hindered secondary amine; b) a dicarboxylic acid in an amount, calculated as neutralization equivalent based on the protonatable nitrogen atoms in a), of at least 30%, wherein the dicarboxylic acid has a solubility in water at a temperature of 20° C. of not more than 15 g of dicarboxylic acid per 100 g of water; and c) 20 to 80 wt % of water. Also described is a process for producing an absorbent from the premixture. The premixture is a transportable and readily handleable solution of a dicarboxylic acid having poor solubility in water for producing an absorbent for removing acid gases from a fluid stream.

6 Claims, No Drawings

(56) References Cited

U.S. PATENT DOCUMENTS

| | | | | |
|---|---|---|---|---|
| 2014/0364354 | A1* | 12/2014 | Kawasaki | C11D 1/37 510/467 |
| 2018/0221811 | A1* | 8/2018 | Vorberg | C10L 3/103 |
| 2019/0381448 | A1* | 12/2019 | Ingram | B01D 53/78 |
| 2019/0388829 | A1* | 12/2019 | Vorberg | B01D 53/1493 |
| 2020/0164303 | A1* | 5/2020 | Ernst | C10L 3/103 |

OTHER PUBLICATIONS

Alexander Apelblat, et al., "Solubility of Ascorbic, 2-furancarboxylic, glutaric, pimelic, salicylic, and o-phthalic acids in water from 279.15 to 342.15K, and apparent molar volumes of ascorbic, glutaric, and pimelic acids in water at 298.15K", J. Chem. Thermodyn., vol. 21, 1989, pp. 1005-1008.

Alexander Apelblat, et al., "Solubility of oxalic, malonic, succinic, adipic, maleic, malic, citric, and tartaric acids in water from 278.15 to 338.15K", J. Chem. Thermodyn., vol. 19, 1987, pp. 317-320.

International Search Report dated Jul. 28, 2017 in PCT/EP2017/058285 filed on Apr. 6, 2017.

* cited by examiner

PREMIX FOR PRODUCING AN ABSORPTION AGENT FOR REMOVING ACID GASES FROM A FLUID FLOW

The present invention relates to a premixture for producing an absorbent for removing acid gases from a fluid stream and a process for producing an absorbent from the premixture.

The removal of acid gases, for example $CO_2$, $H_2S$, $SO_2$, $CS_2$, HCN, COS or mercaptans, from fluid streams such as natural gas, refinery gas or synthesis gas is important for various reasons. For instance, numerous sulfur compounds are malodorous and toxic even at low concentrations. Carbon dioxide needs to be removed inter alia from natural gas since a high concentration of $CO_2$ reduces the calorific value of the gas when used as pipeline or sales gas. $CO_2$ in conjunction with moisture which is frequently entrained in the fluid streams can moreover lead to corrosion of pipes and valves.

Removal of acid gases is achieved using scrubs with aqueous solutions of inorganic or organic bases, for example amines. Dissolution of acid gases in the absorbent causes ions to form with the bases. The absorbent can be regenerated by decompression to a lower pressure and/or stripping, the ionic species undergoing the reverse reaction to form acid gases and/or being stripped out by vapor. The absorbent may be reused after the regeneration process.

The absorbents used for the acid gas scrub often comprise acids. For instance, US 2010/0288125 A1 describes an absorbent comprising at least one amine and at least one phosphonic acid in a molar ratio of 0.0005 to 1.0. U.S. Pat. No. 4,892,674 describes removal of hydrogen sulfide from fluid streams with an absorption solution comprising an amine and a highly sterically hindered amino salt and/or a sterically hindered amino acid.

Protonation equilibria between the acid, and bases present in the absorbent, for example amines, are established. The position of the equilibria is temperature-dependent and at higher temperatures the equilibrium is shifted toward the free oxonium ion and/or the amine salt having the lower enthalpy of protonation. Amines suitable for use in absorbents advantageously exhibit a distinct temperature dependence of the $pK_a$. This has the result that at relatively lower temperatures, as prevail in the absorption step, the higher pH promotes efficient acid gas absorption while at relatively higher temperatures, as prevail in the desorption step, the lower pH supports the release of the absorbed acid gases.

The disadvantage of adding certain acids is that the acid can accelerate decomposition of amines present in the absorbent.

It has now been found that dicarboxylic acids such as succinic acid or adipic acid can likewise facilitate the regeneration of aqueous aminic absorbents. Compared to absorbents comprising for example mineral acids or lower organic acids such as formic acid, absorbents comprising dicarboxylic acids exhibit reduced decomposition of amines such as methyldiethanolamine (MDEA).

The production of absorbents for gas scrubbing is generally effected by mixing low-water concentrates/pure amines or amine mixtures with water directly in the gas scrubbing plant. This keeps the transport volume and the transport weight of the aminic component as low as possible. The metered addition of acids is generally effected shortly before use of the absorbent or during ongoing operation.

The acids are suitably added as aqueous solutions. The disadvantage of using dicarboxylic acids is that these are solids and often exhibit poor solubility in water. Since a metered addition of solids is generally costly and complex and not provided for in most gas scrubbing plants, it is necessary to employ highly dilute aqueous solutions of such dicarboxylic acids. This results in a high transport volume and transport weight of the acid component. The use of highly dilute aqueous solutions of the dicarboxylic acids can also make it necessary to employ large amounts of the solution in order to bring about the desired acid concentration. This can result in unwanted dilution of the absorbent. Dissolution of the dicarboxylic acid in the substantially water-free aminic component is not possible due to the generally even poorer solubility compared to water.

The invention has for its object the provision of a transportable and readily handleable solution of a dicarboxylic acid having poor solubility in water for producing an absorbent for removing acid gases from a fluid stream.

EP 0 134 948 A2 describes a composition for mixing with water to obtain an aqueous alkaline solution. The composition comprises an alkaline material and an acid having a $pK_a$ of less than 6 in an amount sufficient to protonate more than 0% to 22% of the alkaline material. The aqueous alkaline solution exhibits improved properties in the absorption of hydrogen sulfide from a fluid stream compared to solutions without acid.

The object is achieved by a premixture for producing an absorbent for removing acid gases from a fluid stream which comprises:
 a) at least a tertiary amine and/or a sterically hindered secondary amine;
 b) a dicarboxylic acid in an amount, calculated as neutralization equivalent based on the protonatable nitrogen atoms in a), of at least 30%, wherein the dicarboxylic acid has a solubility in water at a temperature of 20° C. of not more than 15 g of dicarboxylic acid per 100 g of water; and
 c) 20 to 80 wt % of water.

It was found that the dicarboxylic acids b) exhibiting poor solubility in water are completely soluble in the composition of the premixture. The production of an absorbent may accordingly be effected by simple mixing of the premixture with water and/or amine at the place of use.

It was further found that the dicarboxylic acids b) bring about a higher stability of decomposition-prone amines such as methyldiethanolamine (MDEA) in aqueous absorbents. This makes a more efficient operation of the gas scrubbing plant possible since the absorbent may be used for longer.

The amine a) comprises a tertiary amine and/or a sterically hindered secondary amine.

The term "tertiary amine" is to be understood as meaning compounds having at least one tertiary amino group. The tertiary amine preferably comprises exclusively tertiary amino groups, i.e. it does not comprise any primary or secondary amino groups in addition to at least one tertiary amino group. The tertiary amine is preferably a monoamine. The tertiary amine preferably does not have any acidic groups such as, in particular, phosphonic acid groups, sulfonic acid groups and/or carboxylic acid groups.

Suitable tertiary amines a) include in particular:
 1. tertiary alkanolamines such as
 bis(2-hydroxyethyl)methylamine (methyldiethanolamine, MDEA), tris(2-hydroxyethyl)amine (triethanolamine, TEA), tributanolamine, 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis(2-hydroxypropyl)methylamine (methyldiisopropanolamine, MDIPA);

2. tertiary amino ethers such as
3-methoxypropyldimethylamine;

3. tertiary polyamines, for example bis-tertiary diamines such as

N,N,N',N'-tetramethylethylenediamine, N,N-diethyl-N', N'-dimethylethylenediamine, N,N,N',N'-tetraethylethylenediamine, N,N,N',N'-tetramethyl-1,3-propanediamine (TMPDA), N,N,N',N'-tetraethyl-1,3-propanediamine (TEPDA), N,N,N',N'-tetramethyl-1,6-hexanediamine, N,N-dimethyl-N',N'-diethylethylenediamine (DMDEEDA), 1-dimethylamino-2-dimethylaminoethoxyethane (bis[2-(dimethylamino)ethyl] ether), 1,4-diazabicyclo[2.2.2]octane (TEDA), tetramethyl-1,6-hexanediamine;

and mixtures thereof.

Tertiary alkanolamines are particularly preferred. Greatest preference is given to methyldiethanolamine (MDEA).

The term "sterically hindered secondary amine" is to be understood as meaning compounds having at least one sterically hindered secondary amino group. The term sterically hindered secondary amino group is to be understood as indicating the presence of at least one secondary or tertiary carbon atom directly adjacent to the nitrogen atom of the amino group.

A secondary carbon atom is to be understood as meaning a carbon atom which, other than the bond to the sterically hindered position, has two carbon-carbon bonds. A tertiary carbon atom is to be understood as meaning a carbon atom which, apart from the bond to the sterically hindered position, has three carbon-carbon bonds.

Suitable sterically hindered secondary amines a) include in particular:

1. sterically hindered secondary alkanolamines such as 2-(2-tert-butylaminoethoxy)ethanol (TBAEE), 2-(2-tert-butylamino)propoxyethanol, 2-(2-tert-amylaminoethoxy) ethanol, 2-(2-(1-methyl-1-ethylpropylamino)ethoxy)ethanol, 2-(tert-butylamino)ethanol, 2-tert-butylamino-1-propanol, 3-tert-butylamino-1-propanol, 3-tert-butylamino-1-butanol, 3-aza-2,2-dimethylhexane-1,6-diol; 2-(2-isopropylaminoethoxy)ethanol, 2-(2-isopropylamino)propoxyethanol, 2-(isopropylamino)ethanol, 2-isopropylamino-1-propanol, 3-isopropylamino-1-propanol, and 3-isopropylamino-1-butanol;

2. sterically hindered amino ethers such as 1,2-bis(tert-butylaminoethoxy)ethane, bis(tert-butylaminoethyl) ether, 2-(2-(2-(tert-butylamino)ethoxy)ethoxy) ethoxy methyl ether (MEEETB);

and mixtures thereof.

Sterically hindered secondary alkanolamines are preferred, in particular sterically hindered secondary alkanolamines comprising a tert-butyl group. Greatest preference is given to 2-(2-tert-butylaminoethoxy)ethanol (TBAEE).

In one embodiment the premixture comprises no sterically unhindered primary amine or sterically unhindered secondary amine. The term sterically unhindered primary amine is to be understood as meaning compounds having primary amino groups to which only hydrogen atoms or primary or secondary carbon atoms are bonded. The term sterically unhindered secondary amine is to be understood as meaning compounds having secondary amino groups to which only hydrogen atoms or primary carbon atoms are bonded.

The premixture comprises a dicarboxylic acid c) in an amount, calculated as neutralization equivalent based on the protonatable nitrogen atoms in a), of at least 30%. The amount of dicarboxylic acid b) in the premixture, calculated as neutralization equivalent based on the protonatable nitrogen atoms in a), is preferably 30% to 400%, particularly preferably 50% to 400%, very particularly preferably 50% to 300% and most preferably 100% to 300%.

The term dicarboxylic acid is to be understood as meaning compounds having two carboxyl groups in the molecule.

The term "neutralization equivalent" is the notional fraction of an acid molecule capable of donating a proton in the neutralization reaction in aqueous solution. For example a molecule of formic acid corresponds to one neutralization equivalent, a molecule of succinic acid to two neutralization equivalents and a molecule of $H_3PO_4$ to three neutralization equivalents.

The term "protonatable nitrogen atoms" relates to the sum of the nitrogen atoms present in the amines according to a) which can be protonated in aqueous solution. These are generally amino group nitrogen atoms.

The dicarboxylic acid has a solubility in water at 20° C. of not more than 15 g of dicarboxylic acid per 100 g of water. The table which follows reports the solubilities of various dicarboxylic acids in water.

| acid | solubility [g/100 g] | temperature [K] | source |
|---|---|---|---|
| oxalic acid | 8.0 | 293.3 | Braban et al.: J. Phys. Chem. A, 2003, (107), p. 6594-6602 |
| malonic acid | 60.0 | 294.3 | Braban et al.: J. Phys. Chem. A, 2003, (107), p. 6594-6602 |
| succinic acid | 5.97 | 293.2 | Oliveira, M. L. N; Franco, M. R: Fluid Phase Equilibria, 2012, (326), p. 50-53 |
| glutaric acid | 54.1 | 293.2 | Apelblat, A.; Manzurola, E.: J. Chem. Thermodyn., 1989, (21), p. 1005-1008 |
| adipic acid | 1.91 | 293.2 | Apelblat, A. Manzurola, E.: J. Chem. Thermodyn., 1987, (19), p. 317-320 |

Suitable dicarboxylic acids c) include in particular oxalic acid, succinic acid, adipic acid, pimelic acid, suberic acid, azelaic acid and sebacic acid. Particular preference is given to adipic acid and succinic acid. Greatest preference is given to succinic acid.

The premixture according to the invention comprises 20 to 80 wt % of water, preferably 30 to 70 wt % of water, particularly preferably 40 to 70 wt % of water and most preferably 50 to 70% of water.

The invention further relates to a process for producing an absorbent for removing acid gases from a fluid stream comprising mixing a premixture which comprises a tertiary amine and/or a sterically hindered secondary amine, a dicarboxylic acid and water, wherein the dicarboxylic acid has a solubility in water at a temperature of 20° C. of not more than 15 g of dicarboxylic acid per 100 g of water and wherein the amount of dicarboxylic acid, calculated as neutralization equivalent based on the protonatable nitrogen atoms of the amines, is greater than in the absorbent, with an amine and optionally water.

The premixture is preferably a premixture as described hereinabove. All mentioned preferred embodiments of the hereinabove-described premixture are also preferred for the premixture employed in the process according to the invention.

The amount of the dicarboxylic acid, calculated as neutralization equivalent based on the protonatable nitrogen atoms of the amines, is greater in the premixture than in the absorbent. In a preferred embodiment the absorbent comprises the dicarboxylic acid in an amount, calculated as neutralization equivalent based on the protonatable nitrogen atoms of the amines, of 0.5% to 15%, particularly preferably 1% to 10% and most preferably 2% to 8%.

It is preferable when the amine with which the premixture is mixed is a tertiary amine and/or a sterically hindered secondary amine. All mentioned preferred embodiments of the hereinabove-described tertiary amines/sterically hindered secondary amines also apply to the amine with which the premixture is mixed. It is particularly preferable when the amine with which the premixture is mixed is the amine present in the premixture.

The amine concentration in the absorbent is typically in the range from 20 to 60 wt %, preferably in the range from 30 to 60 wt %, particularly preferably in the range from 30 to 50 wt %.

If an absorbent selective for hydrogen sulfide over carbon dioxide is desired the absorbent preferably comprises no sterically unhindered primary amine or sterically unhindered secondary amine. Compounds of this type act as strong activators of $CO_2$ absorption. This can result in loss of the $H_2S$ selectivity of the absorbent.

The absorbent may comprise an organic solvent. The organic solvent is particularly preferably selected from sulfones, glycols and polyalkylene glycols. The organic solvent is very particularly preferably selected from sulfones. A preferred organic solvent is sulfolane.

The absorbent may also comprise additives, such as corrosion inhibitors, enzymes etc. The amount of such additives is generally in the range of about 0.01 to 3 wt % of the absorbent.

The absorbent can be employed in a process for removing acid gases from a fluid stream where the fluid stream is brought into contact with the absorbent.

Fluids include gases such as natural gas, synthesis gas, coke oven gas, cracking gas, coal gasification gas, cycle gas, landfill gases and combustion gases and liquids that are essentially immiscible with the absorbent, such as LPG (liquefied petroleum gas) or NGL (natural gas liquids). The process is particularly suitable for treating hydrocarbonaceous fluid streams. The hydrocarbons present are for example aliphatic hydrocarbons, such as $C_1$-$C_4$ hydrocarbons, such as methane, unsaturated hydrocarbons, such as ethylene or propylene, or aromatic hydrocarbons such as benzene, toluene or xylene.

The process is suitable for removing $CO_2$ and $H_2S$. As well as carbon dioxide and hydrogen sulfide, it is possible for other acidic gases to be present in the fluid stream, such as COS and mercaptans. In addition, it is also possible to remove $SO_3$, $SO_2$, $CS_2$ and HCN.

In the process the fluid stream is brought into contact with the absorbent in an absorption step in an absorber to at least partly scrub out carbon dioxide and hydrogen sulfide. This affords a $CO_2$- and $H_2S$-depleted fluid stream and a $CO_2$- and $H_2S$-laden absorbent.

The absorber used is a scrubbing apparatus used in customary gas scrubbing processes. The process may comprise one or more, in particular two, successive absorption steps.

The process preferably comprises a regeneration step where the $CO_2$- and $H_2S$-laden absorbent is regenerated. In the regeneration step $CO_2$ and $H_2S$ and optionally further acidic gas constituents are released from the $CO_2$- and $H_2S$-laden absorbent to obtain a regenerated absorbent. Preferably, the regenerated absorbent is then recycled into the absorption step. The regeneration step generally comprises at least one of the actions of heating, decompressing, and stripping with an inert fluid.

The release of the acidic gas constituents in the regeneration step may be effected for example in a decompression column, for example a vertically or horizontally installed flash vessel, or a countercurrent column comprising internals.

The invention is more particularly elucidated with reference to the examples which follow.

EXAMPLES

The following abbreviations are used:
AA adipic acid
SA succinic acid
MDEA methyldiethanolamine
TBAEE 2-(2-tert-butylaminoethoxy)ethanol

Reference Example 1

This example analyzed the solubility of succinic acid/adipic acid in various amines at 23.5° C.

100 g of MDEA were admixed with 2 g of succinic acid and stirred with a magnetic stirrer. An insoluble sediment was formed. The solubility of succinic acid in MDEA is less than 2 g/100 g.

100 g of TBAEE were admixed with 1.7 g of succinic acid and stirred with a magnetic stirrer. An insoluble sediment was formed. The solubility of succinic acid in TBAEE is less than 1.7 g/100 g.

100 g of MDEA were admixed with 2 g of adipic acid and stirred with a magnetic stirrer. An insoluble sediment was formed. The solubility of adipic acid in MDEA is less than 2 g/100 g.

Example 1

This example analyzed the solubility of succinic acid/adipic acid in aqueous amine solutions at 23.5° C.

This was achieved by adding with stirring carboxylic acid to aqueous amine solutions (starting solutions) as per the table which follows until an insoluble precipitate was formed. The compositions of the aqueous amine solutions at the solubility limit are reported in the table which follows.

| starting solution | | solubility limit composition | | | |
|---|---|---|---|---|---|
| MDEA | TBAEE | MDEA | TBAEE | acid | |
| [wt %] | [wt %] | [wt %] | [wt %] | wt % | neutr. eq.* |
| 20.0 | — | 15.5 | — | SA 23.0 | 299% |
| 60.0 | — | 35.8 | — | SA 40.6 | 229% |
| — | 20.0 | — | 15.9 | SA 20.5 | 352% |
| — | 60.0 | — | 37.5 | SA 37.6 | 274% |
| 20.0 | — | 16.7 | — | AA 17.6 | 172% |
| 60.0 | — | 40.2 | — | AA 33.4 | 135% |

*neutr. eq. = neutralization equivalent based on the nitrogen atoms in MDEA/TBAEE

Reference Example 2

This example analyzed the stability of MDEA in the presence of various carboxylic acids.

Aqueous amine solutions comprising 30 wt % of MDEA, 15 wt % of TBAEE and various carboxylic acids were produced according to the table which follows by mixing. The thus obtained solutions were laden with 20 m³ (STP)/t of $CO_2$ and 20 m³ (STP)/t of $H_2S$. This was achieved by initially charging the aqueous absorbents into a glass cylinder at 40° C. and 1 bar and passing $H_2S/CO_2$ through the solution for about 3 h. The $CO_2/H_2S$ loading was determined by titration and a loading of 20 m³ (STP)/t of $CO_2$ and 20 m³ (STP)/t of $H_2S$ established by subsequent dilution with unladen absorbent. The thus acid-gas-laden solutions were transferred into a nitrogen-filled autoclave. The sealed autoclaves were heated in an oil bath to 160° C. and held at this temperature for 5 days.

After cooling of the autoclaves the samples were removed and the acid gases ($CO_2$ and $H_2S$) stripped with nitrogen. This was achieved by transferring the samples into a glass flask fitted with a cooler and passing $N_2$ through the fully refluxing samples at 100° C. over 4 h. The solutions substantially freed of acid gases were then analyzed for their amine content by gas chromatography. While the TABEE content was virtually unchanged for all samples, marked differences were observed for MDEA depending on the acids employed. The results are shown in the table which follows.

| acid | acid content wt % | neutr. eq.* | MDEA loss |
|---|---|---|---|
| formic acid | 1.10 | 6.9% | 6.14 wt % |
| acetic acid | 1.26 | 6.1% | 6.35 wt % |
| succinic acid | 1.42 | 7.0% | 4.95 wt % |
| adipic acid | 1.66 | 6.6% | 2.44 wt % |

*neutr. eq. = neutralization equivalent based on the nitrogen atoms in MDEA/TBAEE

The invention claimed is:

1. A premixture, comprising
   a) a tertiary amine which is at least one alkanolamine selected from bis(2-hydroxyethyl)methylamine, tributanolamine, 2-diethylaminoethanol, 2-dimethylaminoethanol, 3-dimethylamino-1-propanol, 3-diethylamino-1-propanol, 2-diisopropylaminoethanol, and N,N-bis(2-hydroxypropyl)methylamine;
   b) a dicarboxylic acid in an amount, calculated as neutralization equivalent based on protonatable nitrogen atoms in the tertiary amine, of at least 30%, wherein the dicarboxylic acid has a solubility in water at a temperature of 20° C. of not more than 15 g of dicarboxylic acid per 100 g of water; and
   c) from 20 to 80 wt % of water,
   wherein the premixture is suitable for producing an absorbent for removing acid gases from a fluid stream, and
   wherein the dicarboxylic acid is at least one selected from the group consisting of succinic acid, adipic acid, pimelic acid, suberic acid, azelaic acid, and sebacic acid.

2. The premixture according to claim 1, wherein the amount of the dicarboxylic acid, calculated as neutralization equivalent based on the protonatable nitrogen atoms in a), is from 30% to 400%.

3. The premixture according to claim 1, wherein the dicarboxylic acid is selected from the group consisting of succinic acid and adipic acid.

4. A process for producing an absorbent for removing acid gases from a fluid stream, the process comprising:
   mixing the premixture of claim 1 with an amine and optionally with water,
   wherein the amount of the dicarboxylic acid in the premixture, calculated as neutralization equivalent based on the protonatable nitrogen atoms of the tertiary amine, is greater than in the absorbent.

5. The process of claim 4, wherein the absorbent comprises the dicarboxylic acid in an amount, calculated as neutralization equivalent based on the protonatable nitrogen atoms of the tertiary amine, of from 0.5% to 15%.

6. The process of claim 4, wherein the absorbent is free from sterically unhindered primary amines and sterically unhindered secondary amines.

* * * * *